Feb. 12, 1924.
H. A. WALTMAN ET AL
POP CORN MACHINE
Filed Jan. 30, 1923
1,483,137
2 Sheets-Sheet 1
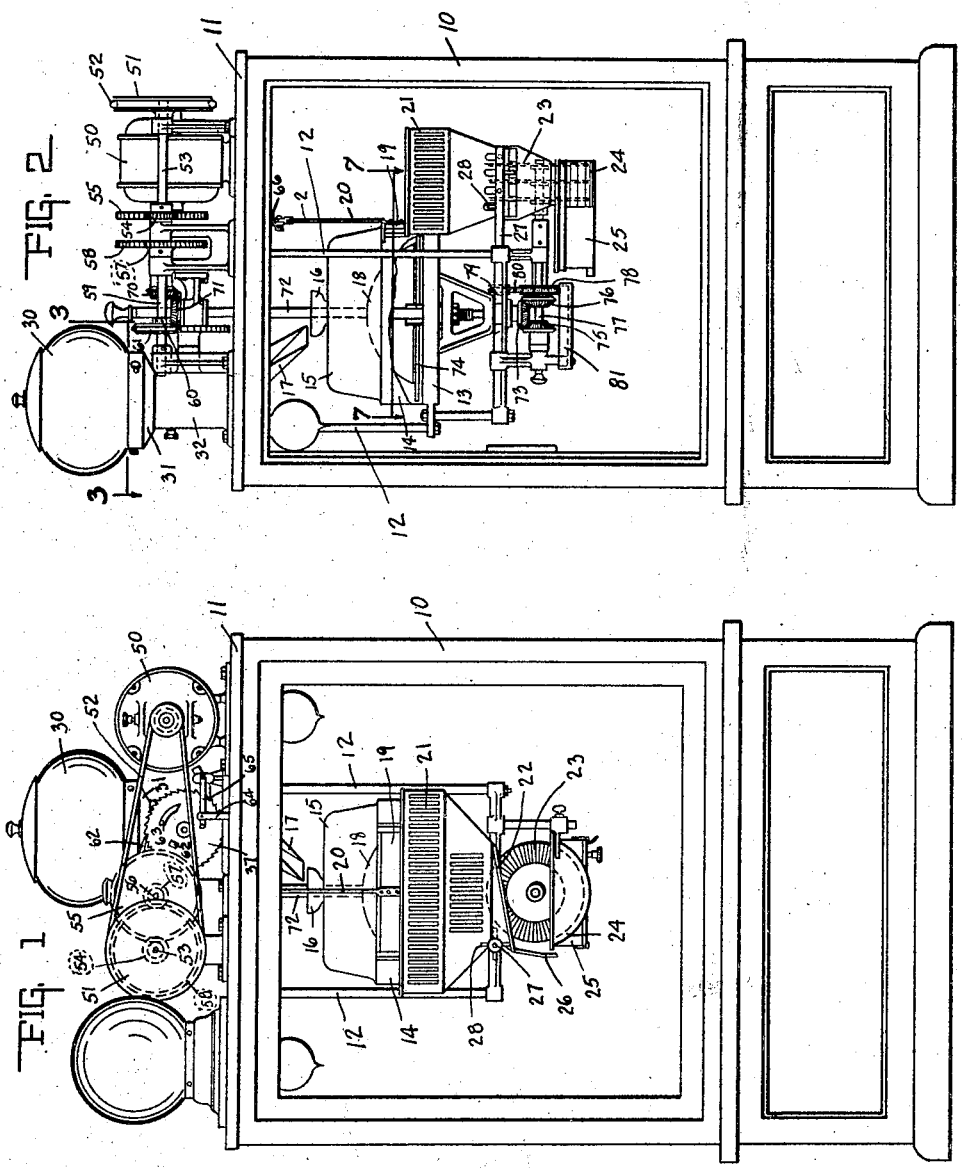
INVENTORS.
HOMER A. WALTMAN.
GEORGE H. ROSSEBO.
BY
ATTORNEYS.

Feb. 12, 1924.
H. A. WALTMAN ET AL
POP CORN MACHINE
Filed Jan. 30, 1923
1,483,137
2 Sheets-Sheet 2
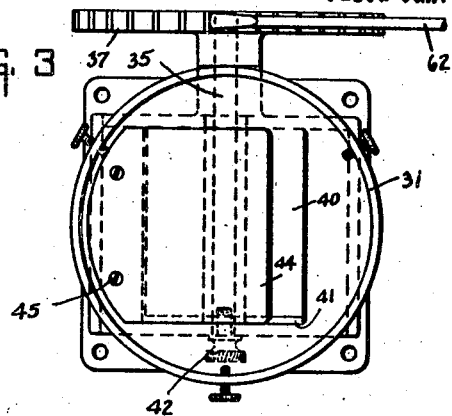
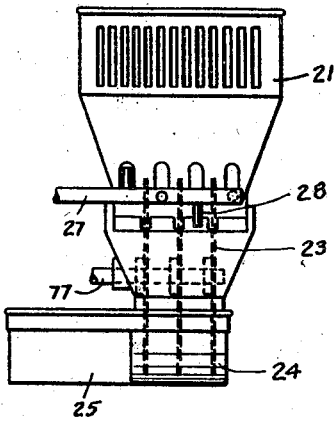
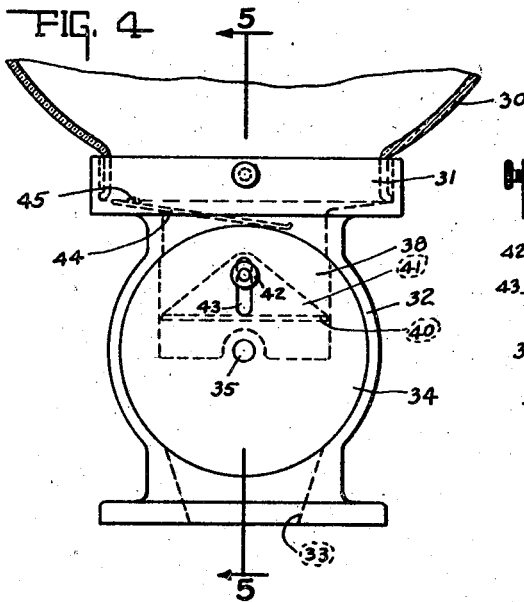
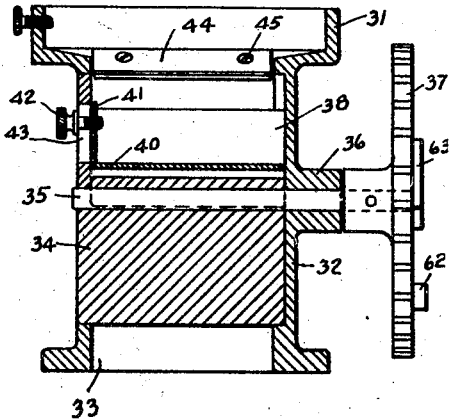
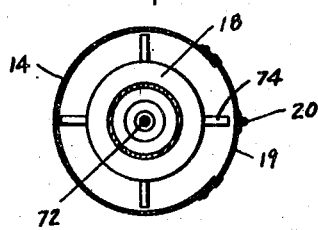
INVENTORS.
HOMER A. WALTMAN.
GEORGE H. ROSSEBO.
BY
ATTORNEYS.

Patented Feb. 12, 1924.

1,483,137

UNITED STATES PATENT OFFICE.

HOMER A. WALTMAN AND GEORGE H. ROSSEBO, OF INDIANAPOLIS, INDIANA, ASSIGNORS TO HOLCOMB & HOKE MFG. CO., OF INDIANAPOLIS, INDIANA, A CORPORATION.

POP-CORN MACHINE.

Application filed January 30, 1923. Serial No. 615,962.

*To all whom it may concern:*

Be it known that we, HOMER A. WALTMAN and GEORGE H. ROSSEBO, citizens of the United States, and residents of Indianapolis, county of Marion, and State of Indiana, have invented a certain new and useful Pop-Corn Machine; and we do hereby declare that the following is a full, clear, and exact description thereof, reference being had to the accompanying drawings, in which like numerals refer to like parts.

This invention relates to a pop corn machine, and particularly that type of machine which mechanically measures and discharges the unpopped corn into a hopper heated by an electric hot plate from which it is discharged after having been popped into a trough where it is mechanically buttered and discharged for sale.

The main object of the invention is to produce a pop corn machine of this type at reduced cost, but with a capacity nearly as great as that of more expensive machines, the saving in cost being possible through the simplification of the mechanism and reduction of parts rather than the quality of material and workmanship.

One feature of the invention resides in the mechanism actuated by the machine for buttering the popped corn and discharging the same for consumption.

Another feature of the invention resides in the adjustable measuring device for measuring the charges of unpopped corn delivered to the popping element and hot plate.

A further feature of the invention resides in the simplified driving mechanism, and particularly in the central driving shaft for the agitating arms in the popping element.

The full nature of the invention will be understood from the accompanying drawings and the following description and claims.

In the drawings, Fig. 1 is a front elevation of the machine. Fig. 2 is a side elevation viewing the same from the left side thereof with a portion of the enclosing wall of the popping element being broken away. Fig. 3 is an enlarged section taken on the line 3—3 of Fig. 2 showing the measuring device. Fig. 4 is a side elevation of the measuring device. Fig. 5 is a section taken on the line 5—5 of Fig. 4. Fig. 6 is an enlarged front elevation of the buttering mechanism. Fig. 7 is a section taken on the line 7—7 of Fig. 2.

In the drawings there is shown a pop corn machine having a cabinet 10 enclosed in the usual manner by glass sides and provided with a top for supporting the driving mechanism, and a hopper for unpopped corn. Suspended from the top 11 so as to extend inside of the cabinet, there are supporting frame bars 12 adapted to support the usual electrically heated hot plate 13, on which is mounted an annular sheet metal wall 14 which is covered and enclosed by a heat-resisting glass top or closure 15. Said closure is provided with an opening at the top and a funnel 16 for receiving the unpopped corn which is discharged therein from the discharge chute 17. The corn falls on a central dome-like member 18 which causes it to spread out about the peripheral surface of the hot plate.

On the front side of the wall 14, there is an opening which is opened and closed by a vertically sliding door or gate 19 which is raised and lowered by the rod 20. Said door is in position to permit the popped corn to be discharged through the opening in the wall into and on a metal hopper 21 which is provided with an inclined bottom 22. The inclined bottom 22 upon which the popped corn falls is provided with three longitudinal slots through which the three butter-carrying disks 23 extend. Said disks are corrugated radially so as to facilitate the carrying of butter upon their surfaces. A melted butter trough 24 is suspended immediately below the disks so that they will be revolved in the butter contained therein; and adjacent said trough there is a butter melting pan 25 provided with the usual hot plate for melting cakes of butter therein and permitting the melted butter to run to said trough. The inclined bottom 22 is provided with a downwardly extending apron 26 for preventing the corn falling therefrom from dropping into the trough 24. Extending horizontally across the lower end of the bottom 22, there is a shaft 27 provided with a plurality of radially extending fingers 28, said fingers being so positioned as to extend between and on each side of the buttering disks 23, and of such length as to just miss the bottom 22 when rotated. Said fingers are rotated by the shaft 27 so as to engage and force the popped corn off of the inclined bottom 22 after the butter has been applied thereto by the buttering disks 23. The rotation of the shaft 27 and the fingers is so timed as to discharge the corn at an even rate, but hold the bulk thereof back for permitting the butter to be applied. Said fingers further tend to keep the discharge end of the bottom free from accumulated corn and prevent the discharge opening of the buttering trough from becoming clogged therewith.

The unpopped corn is contained in a hopper 30 which opens into a neck 31 communicating with the cylindrical casing 32 which is secured on the top of the cabinet and is provided with the passage 33 extending therethrough to the delivery chute 17. Rotatably mounted in the casing 32, there is a cylindrical rotating cup 34 supported on the shaft 35 mounted in the bearing 36 and rotated by the ratchet wheel 37. Said cylindrical cup 34 is provided with a corn-receiving and measuring chamber 38 into which the unpopped corn may drop from the hopper 30 through the neck 31 when said cup member is rotated to the position shown in Figs. 4 and 5. Upon receiving a charge of corn from the hopper, the rotation of the cup member is continued until the chamber 38 is inverted, registering with the opening 33 through which the corn will be discharged through the chute 17 into the popping element. The rotation of the cup may be timed so that a charge of corn will be delivered to the popping element upon the popped corn being discharged therefrom through the gate 19. The charge of corn received by the cup member may be varied in accordance with the adjustment of the bottom plate 40, which covers the bottom area thereof, and is adjustably supported by the vertically extending wing 41 which is clamped in adjusted position against the side wall of the cup by the set screw 42, said set screw extending through a slot 43 in said wall. For preventing the corn or dust therefrom from dropping between the cylindrical cup and the casing 32, there is provided a plate 44 secured to said casing by the screws 45 and extending forwardly adjacent to and over the top of the cup member, as shown in Fig. 4.

The driving mechanism comprises a motor 50 mounted on the top of the cabinet which drives a pulley 51 through the belt 52, said pulley being keyed on the shaft 53 supported in suitable bearings on said cabinet. Locked to the shaft 53, there is a pinion 54 which meshes with and drives the gear 55, said gear 55 being keyed on the shaft 56 on which is also keyed the pinion 57. The pinion 57 meshes with and drives the gear 58 keyed on the shaft 59. Keyed on the shaft 59, there is a cam 60 about which the collar 61 rides, to which is secured the finger 62 positioned so as to engage the ratchet teeth in the ratchet 37 upon each revolution of the cam 60, and thereby slightly turning the ratchet wheel 37. It will be observed therefor that upon each revolution of the shaft 59, the ratchet wheel 37 will be rotated a distance corresponding to a single ratchet tooth. Mounted on the face of the ratchet wheel 37, there is an arcuate boss 63, which when rotated with said wheel will engage a pin on the link 64, which is pivotally connected to the top of the machine by an arm 65. The elevation of said link 64, which is connected to the rod 20 by the link connections 66, will elevate said rod and raise the gate 19 so as to permit the discharge of the popped corn from the popping element. Upon the engagement of the boss 67 mounted on the side of the ratchet 37 with the pin on the link 64, said link will be forced downwardly so as to cause the gate 19 to be closed.

The beveled gear 70 is keyed to the shaft 56 so as to be driven directly by the gear 55, and is in position to mesh with the bevel gear 71 keyed to the shaft 72, said shaft being mounted in suitable bearings and extending vertically downward through the top of the cabinet, through the openings 16 in the popping element and through the hot plate 13, terminating in the beveled gear 73. Keyed to the shaft 72 are radially extending agitating arms 74 which lie adjacent the top of the hot plate and immediately under the dome 18 so as to stir the corn while popping and prevent portions of the corn from sticking to the hot plate. Said arms which are rotated by the shaft 72 also serve to agitate the corn and discharge it through the opening in the wall when the gate 19 is elevated. The bevel gear 73 meshes with the bevel gear 75 and 76 on each side thereof. The gear 75 is keyed on the shaft 77 which is supported by suitable bearings and drives the buttering disks 23. The gear 76 is rotatably mounted on the shaft 77 and carries with it a pulley 78 which drives the pulley 79 keyed to the shaft 27 which drives the fingers 28, said pulley 79 being driven by the belt 80. Supported immediately below the gears 73, 75 and 76, there is an oil pan 81.

In operation, the hopper 30 is filled with unpopped corn and the power turned on. The hot plate 13 is then heated and a suitable hot plate is also heated for melting the butter in the heating pan 25. The melted butter will run into the trough 24 in position to be carried on the corrugated sides of the buttering disks 23. The driving mechanism will then rotate the shaft 72 which will cause the arm 74 to slowly revolve about the heating element, and will also cause the buttering disks 23 and the fingers 28 to slowly rotate. Through the rotation of the cam 60, the ratchet wheel 37 will be slowly rotated so that the cup chamber 38 will be carried to a position to receive a charge of corn, and thence to a position to dump it into the chute 17 through the opening 16 in the popping element. The plate 43 will have been adjusted to measure the proper charge of corn. The corn will then be spread out on the plate by the dome 18 and heated to such degree as to be popped. During the popping thereof, the arms 74 slowly rotating will keep the corn agitated and prevent its sticking or burning on the hot plate. The projections 63 and 67 mounted on the ratchet wheel 37, being properly positioned for timing the operation, will reach a point wherein the gate 19 will be elevated at the time that the corn is properly popped. The finger 74 will then cause the corn to be discharged through said gate into the trough 21 and it will fall on the inclined bottom 22. The projection 67 on the ratchet wheel 37 will then cause the gate 19 to close and in the meantime the rotation of said ratchet wheel will have caused another charge of unpopped corn to be discharged into the popping element. The popped corn received on the bottom 22 will be subjected to the buttering process by engagement with the butter-covered disks 23, and as it is buttered, the revolving arms 28 will slowly engage the same and cause it to be discharged evenly in the proper amounts to insure sufficient application of butter and prevent gathering and clogging at that point.

The invention claimed is:

1. A pop corn machine comprising a supporting frame, a popping element mounted in said frame, means for discharging unpopped corn therein, means for causing the discharge of the popped corn therefrom, a hopper supported adjacent said popping element for receiving said discharged corn, means for applying butter to the corn discharged therein, and means mounted in said hopper for engaging and removing the corn therefrom.

2. A pop corn machine comprising a supporting frame, a popping element mounted in said frame, means for discharging unpopped corn therein, means for causing the discharge of the popped corn therefrom, a hopper supported adjacent said popping element for receiving said discharged corn, means for applying butter to the corn discharged therein, and rotatable means mounted in said hopper for engaging and removing the corn therefrom.

3. A pop corn machine comprising a supporting frame, a popping element mounted in said frame, means for discharging unpopped corn therein, means for causing the discharge of the popped corn therefrom, a hopper supported adjacent said popping element for receiving said discharged corn, means for applying butter to the corn discharged therein, a shaft positioned adjacent the mouth of said hopper, means for rotating said shaft, and a plurality of radially extending fingers projecting from said shaft and positioned to engage and forcibly discharge the corn from said hopper.

4. A pop corn machine comprising a supporting frame, a popping element mounted in said frame, means for discharging unpopped corn therein, means for causing the discharge of popped corn therefrom, a hopper supported adjacent said popping element for receiving said discharged corn, a butter-containing receptacle associated with said hopper, a plurality of corrugated disks adapted to revolve within said receptacle and extending into said hopper to carry butter to the corn contained therein, means for driving said disks, and means mounted in said hopper for engaging and removing the corn therefrom.

5. A pop corn machine comprising a supporting frame, a popping element mounted in said frame, means for discharging unpopped corn therein, means for causing the discharge of popped corn therefrom, a hopper supported adjacent said popping element for receiving said discharged corn, a butter-containing receptacle associated with said hopper, a plurality of corrugated disks adapted to revolve within said receptacle and extending into said hopper to carry butter to the corn contained therein, means for driving said disks, and rotatable means mounted in said hopper for engaging and removing the corn therefrom.

6. A pop corn machine comprising a supporting frame, a popping element mounted in said frame, means for discharging unpopped corn therein, means for causing the discharge of popped corn therefrom, a hopper supported adjacent said popping element for receiving said discharged corn, a butter-containing receptacle associated with said hopper, a plurality of corrugated disks adapted to revolve within said receptacle and extending into said hopper to carry butter to the corn contained therein, means for driving said disks, a shaft positioned adjacent the mouth of said hopper, means for rotating said shaft, and a plurality of radially extending fingers projecting from said shaft and positioned to engage and forcibly discharge the corn from said hopper.

7. A pop corn machine comprising a supporting frame, a popping element mounted in said frame, an unpopped corn hopper, a casing communicating at its upper end with said hopper and through its lower end with said popping element, a member rotatably mounted in said casing having a corn-receiving chamber, means for rotating said member, whereby in one position said chamber may receive corn from said hopper, and when rotated to the other position will permit said corn to pass therefrom into said popping element, and adjustable means for varying the capacity of said chamber.

8. A pop corn machine comprising a supporting frame, a popping element mounted in said frame, an unpopped corn hopper, a casing communicating at its upper end with said hopper and through its lower end with said popping element, a member rotatably mounted in said casing having a corn-receiving chamber, means for rotating said member, whereby in one position said chamber may receive corn from said hopper, and when rotated to the other position will permit said corn to pass therefrom into said popping element, and a plate adjustably mounted in said chamber for varying the capacity thereof.

9. A pop corn machine comprising a supporting frame, a popping element mounted in said frame, an unpopped corn hopper, a casing communicating at its upper end with said hopper and through its lower end with said popping element, a member rotatably mounted in said casing having a corn-receiving chamber, means for rotating said member, whereby in one position said chamber may receive corn from said hopper and when rotated to the other position will permit said corn to pass therefrom into said popping element, and a corrugated plate positioned between said hopper and casing and lying adjacent said member for preventing corn and dust from passing between said member and casing.

10. A pop corn machine comprising a supporting frame, a popping element mounted in said frame, means for discharging unpopped corn therein, means for causing the discharge of popped corn therefrom, means for actuating said charging and discharging mechanism, rotating means in said popping element, and a shaft driven by said actuating means and extending downwardly through the center of said popping element for driving said rotating means.

11. A pop corn machine comprising a supporting frame, a popping element mounted in said frame, means for discharging unpopped corn therein, means for causing the discharge of popped corn therefrom, means for actuating said charging and discharging mechanism, a plurality of radially extending fingers rotatably mounted in said popping element for agitating and discharging the corn therein, and a shaft driven by said actuating means and extending downwardly through the center of said popping element for driving said rotating means.

In witness whereof, we have hereunto affixed our signatures.

HOMER A. WALTMAN.
GEORGE H. ROSSEBO.